United States Patent

[11] 3,633,178

[72] Inventor Vincent R. Zopf
Commack, N.Y.

[21] Appl. No. 863,643
[22] Filed Oct. 3, 1969
[45] Patented Jan. 4, 1972

[73] Assignee General Instrument Corporation
Newark, N.J.

[54] TEST MESSAGE GENERATOR FOR USE WITH COMMUNICATION AND COMPUTER PRINTING AND PUNCHING EQUIPMENT

41 Claims, 4 Drawing Figs.

[52] U.S. Cl. .......... 340/172.5
[51] Int. Cl. .......... G06f 3/00, G06k 5/00
[50] Field of Search .......... 340/172.5, 146.1, 173; 235/153

[56] References Cited

UNITED STATES PATENTS

| | | | |
|---|---|---|---|
| 2,996,666 | 8/1961 | Baker | 340/172.5 X |
| 3,238,510 | 3/1966 | Ergott, Jr. | 340/172.5 |
| 3,344,410 | 9/1967 | Collins et al. | 340/172.5 |
| 3,401,379 | 9/1968 | Prell et al. | 340/146.1 X |
| 3,405,258 | 10/1968 | Godoy et al. | 340/172.5 |

OTHER REFERENCES

IBM Technical Disclosure Bulletin, Vol. 8, No. 2, July 1965, pp. 251–252, Supervisory Controls by Hackl

*Primary Examiner*—Gareth D. Shaw
*Assistant Examiner*—Paul R. Woods
*Attorney*—James and Franklin

ABSTRACT: A message generator has the capability of selectively producing standard test messages to test communication and computer printing and punching equipment on an off-line basis. The generator comprises a memory in which the test messages are stored, preferably in a permanent form. That memory is selectively addressed in accord with the desired test message to be produced.

INVENTOR
VINCENT R. ZOPF
BY James and Franklin
ATTORNEY

INVENTOR
VINCENT R. ZOPF
BY James and Franklin
ATTORNEY

FIG. 3

| ROW ADDRESS (DECIMAL) | BIT CONTENT | | | | |
|---|---|---|---|---|---|
| | 1 | 2 | 3 | 4 | 5 |
| 1 CR | 0 | 0 | 0 | 1 | 0 |
| 2 CR | 0 | 0 | 0 | 1 | 0 |
| 3 LF | 0 | 1 | 0 | 0 | 0 |
| 4 S | 1 | 0 | 1 | 0 | 0 |
| 5 H | 0 | 0 | 1 | 0 | 1 |
| 6 O | 0 | 0 | 0 | 1 | 1 |
| 7 R | 0 | 1 | 0 | 1 | 0 |
| 8 T | 0 | 0 | 0 | 0 | 1 |
| 9 | 0 | 0 | 1 | 0 | 0 |
| 10 L | 0 | 1 | 0 | 0 | 1 |
| 11 I | 0 | 1 | 1 | 0 | 0 |
| 12 N | 0 | 0 | 1 | 1 | 0 |
| 13 E | 1 | 0 | 0 | 0 | 0 |
| 14 CR | 0 | 0 | 0 | 1 | 0 |
| 15 CR | 0 | 0 | 0 | 1 | 0 |
| 16 LF | 0 | 1 | 0 | 0 | 0 |
| 17 T | 0 | 0 | 0 | 0 | 1 |
| 18 H | 0 | 0 | 1 | 0 | 1 |
| 19 E | 1 | 0 | 0 | 0 | 0 |
| 20 | 0 | 0 | 1 | 0 | 0 |
| 21 Q | 1 | 1 | 1 | 0 | 1 |
| 22 U | 1 | 1 | 1 | 0 | 0 |
| 23 I | 0 | 1 | 1 | 0 | 0 |
| 24 C | 0 | 1 | 1 | 1 | 0 |
| 25 K | 1 | 1 | 1 | 1 | 0 |
| 26 | 0 | 0 | 1 | 0 | 0 |
| 27 B | 1 | 0 | 0 | 1 | 1 |
| 28 R | 0 | 1 | 0 | 1 | 0 |
| 29 O | 0 | 0 | 0 | 1 | 1 |
| 30 W | 1 | 1 | 0 | 0 | 1 |
| 31 N | 0 | 0 | 1 | 1 | 0 |
| 32 | 0 | 0 | 1 | 0 | 0 |

INVENTOR
VINCENT R. ZOPF
BY James and Franklin
ATTORNEY

INVENTOR
VINCENT R. ZOPF
BY James and Franklin
ATTORNEY

TEST MESSAGE GENERATOR FOR USE WITH COMMUNICATION AND COMPUTER PRINTING AND PUNCHING EQUIPMENT

The present invention relates to testing apparatus, and particularly to an apparatus for use in testing communication and computer external equipment such as, but not limited to, printing and punching equipment.

For a communication or computer data signal to be intelligible or useful, it must be converted into a form that can be either directly interpreted, e.g., printed characters or words, or into a form which can be further processed by a computer, e.g., a punched card or tape. For this purpose computers are commonly provided with output or external equipment (hereafter sometimes generally designated "printer," it being understood that this term is used in a broad sense to include any device which has the capability of converting the computer data signal, which may be in binary word form, to the desired useful output form.

Since the reliability of such equipment limits the reliability of the equipment system of which it is a part, the equipment should be, and often is, periodically and frequently tested. As these tests are presently performed the printer is tested on a quasi-on-line basis, that is, it remains in operative connection with the data source (computer) during the performance of the test. The computer provides a signal to the printer, which if operating correctly, produces a proper printed or punched output. In typical prior art test procedures, the computer is programmed to provide a test message to the output printing equipment, and the communications system is provided with a prepunched tape and a tape reader to transmit the test message to the output equipment.

The drawbacks involved in the known output equipment test procedures result primarily from the necessity of retaining the computer in the test system for the entire period of equipment evaluation and for the duration of such troubleshooting as may prove to be needed. All necessary repair and maintenance work on the printer must be performed while the printing equipment is tied into the computer or other data source. The computer must thus be tied up in what is essentially nonproductive activity for considerable periods of time; this is clearly wasteful both in time and in money. Moreover, the need for troubleshooting the printing equipment at the site of the computer rather than in a more convenient and remote maintenance area is often a source of considerable difficulty to the service personnel.

It is an object of the present invention to provide a test signal generator for testing output equipment which permits that equipment to be tested independently of its data source.

It is another object of the present invention to provide a test message generator which has the capability of producing one or more of a number of test messages for use in testing output equipment such as communication and computer printing and punching equipment.

It is a further object of the present invention to provide a test signal generator for use in testing computer and communications output equipment which permits the testing and maintenance of the output equipment at a location remote from the main data source.

It is still another object of the present invention to provide a test signal generator for testing communications and computer printing and equipment which is light in weight and hence readily transportable by maintenance personnel between testing sites.

To these ends a test message generator is provided having the capability of providing a selected one of several test messages to an output device. The test characters, which are used to form the various test messages, are stored at the address locations in a memory. That memory is selectively addressed to read out the desired succession of test characters from the memory, thereby to form the desired test message. That selected message is then transferred to the output equipment.

The memory addressing is controlled by message select circuitry which presets the address circuitry to address those portions of the memory in which the appropriate test characters are stored. That address circuitry may be, as herein shown, in the form of row and column counters. The addressing of the memory, unless inhibited, proceeds sequentially from the initially addressed portion of the memory to provide a complete desired message to the printer, after which the address circuitry is reset to its initial condition and the test message is repeated.

Also stored in the memory is an end-of-message sequence or word, which when addressed and detected causes the termination of memory readout and the resetting of the row and column counters to their starting condition. Means are provided to count the number of test messages being transferred to the output equipment. After a predetermined number of test messages has been provided, the addressing circuit is set to select an address in the memory corresponding to the address location of the end-of-message word. In this manner, the transmittal of a test message to the output equipment is terminated after a predetermined number of test messages is supplied.

To the accomplishment of the above, and to such other objects as may hereinafter appear, the present invention relates to the design and manner of operation of a test message generator as defined in the appended claims and as described in this specification, taken together with the accompanying drawings, in which:

FIG. 3 is a typical stored word content of a single column of the memory of the message generator of FIG. 1.

As herein specifically described, the message generator of the present invention is adapted for use in testing the printer equipment of a communications system although use with a digital computer is also implied. It does this by selectively supplying one or more standard test messages to the printer in binary form. The generator described is capable of producing messages in either the International Telegraph Alphabet No. 2 (ITA-2) (American Version), or the American Standard Code for Information Interchange (ASCII). The available test messages that can be supplied by the generator in either of these codes are herein described as being the short line test only, "Fox Test" only, complete message which is a combinds short line and Fox Test, discrete characters, or a "checkerboard" pattern test.

It has been found that by proving the printer with one or more of these test messages in either of the two available codes, a complete test of printer operation may be performed. It will be understood, however, that the codes and messages are herein described merely for purposes of illustrating the operation of the invention and are in no way intended to limit the invention.

Figure 1:
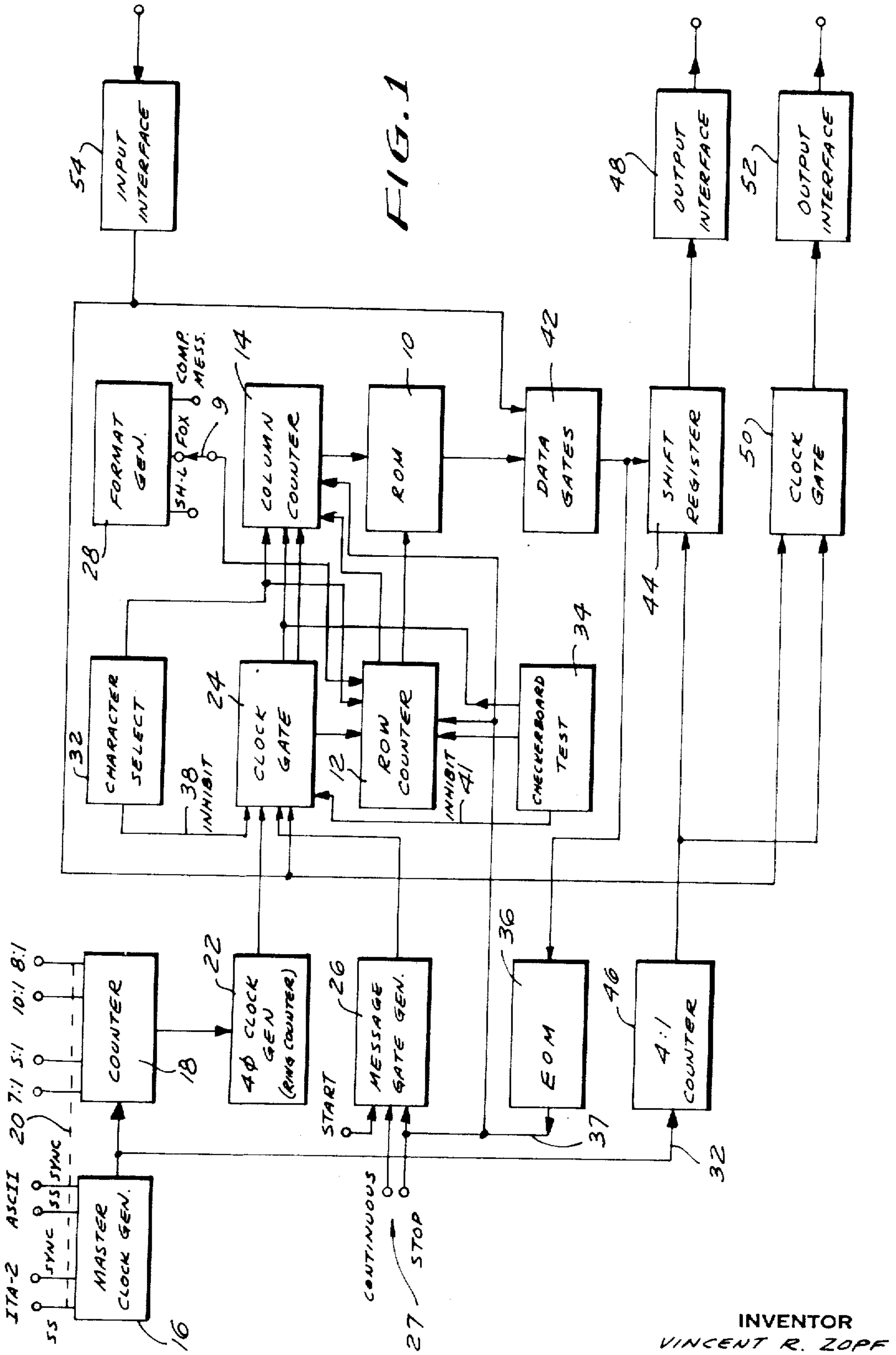
FIG. 1 is a schematic block diagram of the test message generator of the invention.

Referring to FIG. 1, a read-only memory (ROM) 10 has a plurality of test characters stored at address locations therein. These address locations are defined at the intersections of a plurality of rows and columns, address selection being performed by selecting a given row and a given column. As herein described memory 10 comprises 32 rows and 8 columns, defining at their intersections a total of 256 address locations. A memory of this type, which can be employed to good advantage in the message generator of the invention, is described in a copending application, Ser. No. 791,759, entitled "Read Only Memory," filed in the name of Andrew G. Varadi et al., and assigned to the assignee of the present application.

Memory 10 contains short line and Fox Test messages permanently stored therein in both the ITA-2 and ASCII codes. Also stored in the memory 10 is an end-of-message sequence or word, also in both codes. Each message consists of a plurality of characters each of which is stored at a different address location in memory 10. In the ITA–2 code each character is defined by a five-bit word, and in the ASCII code each character is defined by an eight-bit word. FIG. 3 illustrates a plurality of words in the ITA–2 code stored in a typical single column, here column 1, of memory 10. That column has printed at its 32 rows characters which make up the words SHORT LINE in rows 4–13, and characters which make up the first three words, THE QUICK BROWN, of the Fox test stored in rows 17–32. Rows 1–3, and 14–16 have the CRCRLF instructions for the printer which causes the carriage to return to the left-hand margin to begin a printing operation on a new line. Rows, 9, 20, 26 and 32 in column 1 of memory 10 contain characters which cause the printer to produce a space between the words of the printed message.

Memory 10 is addressed to select a given character by the operation of row and column select circuitry represented respectively by row counter 12 and column counter 14. The row and column counters respectively provide five- and three-bit row and column select signals to appropriate row and column decode circuitry in memory 10. Suitable address circuitry for this purpose is described in detail in said copending application.

The initial address selection, which corresponds to the beginning of the selected test message to be read out and transferred from memory 10 for purposes of applying that message to the printer, is accomplished by presetting row counter 12 and column counter 14 to produce the appropriate row and column select signals. The row address is then sequentially changed each cycle (with the exception of the checkerboard and discrete character test) to sequentially address the memory, thereby to supply a new character to the printer each cycle of generator operation. At the completion of the last or 32nd row in a selected column, a trigger pulse is produced by the row counter 12 and applied to the column counter 14 to set the latter to address the next column. The rows in that next column are then sequentially addressed. This process continues until a test message is completed, after which the row and column counters are reset to the start address for that message, thereby to initiate a new message readout sequence. After a predetermined number of test messages are repetitively transmitted to the printer the row and column select circuits are reset to address the memory to select or read out the end-of-message word stored therein. Means are provided to detect the presence of that word and thereafter to terminate the operation of the test message generator.

The base frequency of the test message generator is defined by a variable master cock generator 16. The output of clock generator 16 is applied to the input of a variable counter 18 which counts down the master clock frequency by a determined factor depending on the selected code and mode of operation. Clock generator 16 and counter 18 are adjustable by the operation of a code select switch indicated by the broken line 20. Switch 20 is manually actuated to select the character code and the mode of operation, i.e., either the start-stop mode or the synchronous mode. In the former mode, two additional bits are added to each character, one at the beginning and one at the end of the character. The operation of switch 20 adjusts the frequency of clock generator 16 and counter 18 to allow for variations in the character length, to wit, the number of bits in each character in accord with the selected operating mode and the selected code.

The output of counter 18 is connected to a four-phase clock generator 22 which may be in the form of a ring counter. Generator 22 provides four-phase clock signals to a clock gate 24. A message gate generator 26 is controlled by a manually actuated start-continuous-stop command unit 27 and its output is fed to clock gate 24 and enables or disables the latter. Clock gate 24, when enabled, supplies sequential clock signals to the row counter 12 to periodically change the row address signal supplied to memory 10. In this manner, a new address location in memory 10 is selected and a different signal or character is supplied to the printer each cycle.

Figure 2:
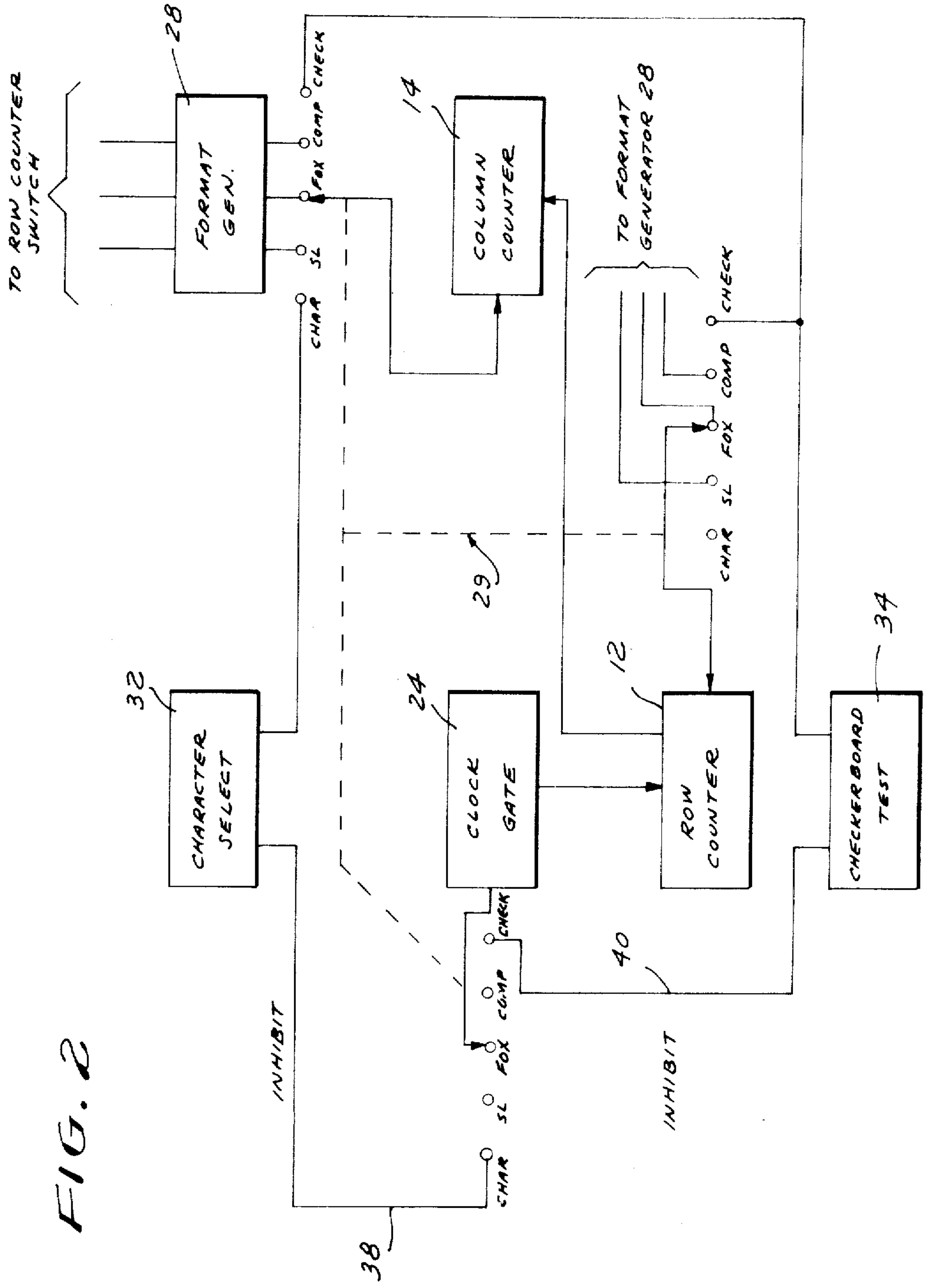
FIG. 2 is a partial block diagram of the test generator illustrating the test message selection switch shown in condition for selecting a Fox test.
Figure 4:
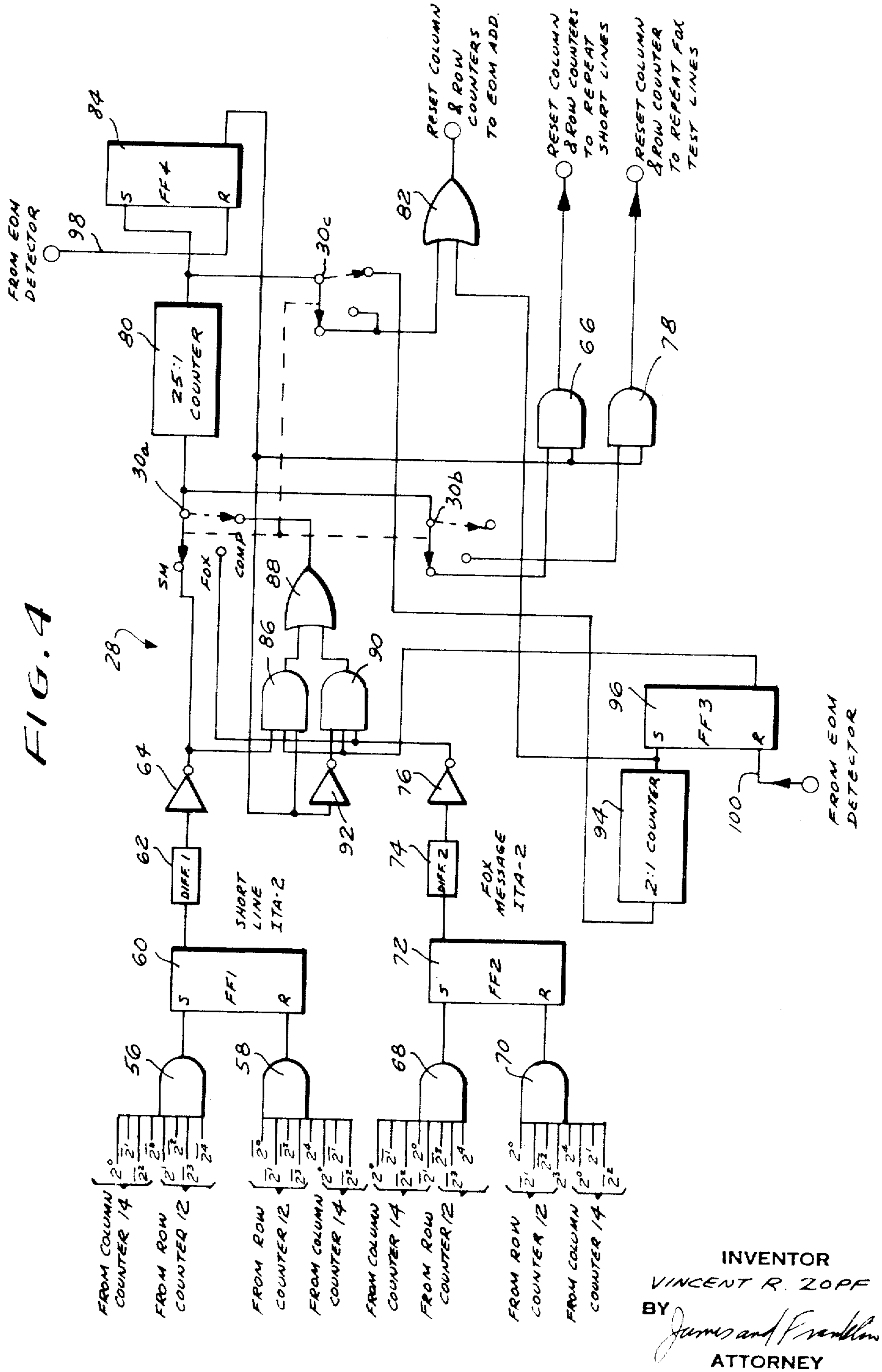
FIG. 4 is a schematic block diagram of the format generator of the message generator of the present invention.

The selection of the desired test message is performed by the operation of five-position test message selection switch 29 (FIG. 2) which connects one of the three message test units shown in FIG. 1 (format generator 28, discrete character test unit 32 and checkerboard test unit 34) to the address and clock circuitry.

Format generator 28, which is illustrated in greater detail in FIG. 3, is connected to the address circuitry through that switch 29 when a short line, Fox or complete message test is to be sent to the printer. Generator 28 comprises an internal message selector switch 30 which is actuatable along with the message selection switch 29 to internally condition format generator 28 for operation at the selected one of these test messages. The message selection switch 29 is effective to connect one of the three available test message units to the address circuitry and, along with code switch 20, is effective to present the stages in the row and column counters in accord with the selected message and code.

At the beginning of a test with the format generator 28 operatively connected, memory 10 is addressed to initiate the transmittal of a predetermined number of the desired test message to the printer. Upon the completion of a predetermined number of short line, Fox, or complete test messages, memory 10 is addressed to select the end-of-message word in the appropriate code. That word is transmitted to the external printer to signal the printer of the completion of a message and to an end-of-message unit 36 in which a corresponding word is stored. Unit 36 compares its stored word and the word read out from memory 10 and when the two words are identical, unit 36 produces a stop signal at line 37, that signal being applied to the input of message gate generator 26 to disable the latter, thereby to reset the row and column counters and end the transmittal of a test message to the printer.

Character select unit 32, which may conveniently be in the form of a rotary switch, is effective when manually selectively actuated to preset the row and column counters to select a single address location in memory 10, and to simultaneously inhibit the operation of clock gate 24 as indicated by the inhibit signal on line 38. As a result a single repeating character, corresponding to the character stored at that single address location, is read out from memory 10 and supplied to the printer.

In a checkerboard test pattern a repeating pair of characters is supplied to the printer. This test is controlled by checkerboard test unit 34, which may be in the form of a toggle or flip-flop. Unit 34 provides two alternating address select signals, which may be a binary word and its complement, to row counter 12 and column counter 14, while simultaneously supplying an inhibit signal on line 40 to clock gate 24. The resulting message supplied to the printer is thus a repeating pair of test characters corresponding to those characters stored in the two alternately selected address locations in memory 10.

The test message, as determined by the selection of units 28, 32 or 34, and by the setting of the selected such unit, is transmitted from memory 10 to the external printer through an output stage which comprises a plurality of data gates 42, one such gate being provided for each bit in the test character. The outputs of gates 42 are applied to and stored in parallel form in the stages of a 10-bit shift register 44. The bits of the test character are stored in register 44 at bit locations determined by the test character code and the operating mode of the generator, i.e., start-stop or synchronous, as determined by the operation of switch 20. When in the start-stop mode, appropriate additional pulses are stored into register 44 both before and after the bits of the stored test character. Register 44 receives its shift pulses from the output of 4-to-1 counter 46, which receives input signals from master clock 16. Each of these shift pulses shifts one bit from register 46 to the output device. Counter 46 counts down the signal from generator 16 by a factor corresponding to the frequency reduction effected by counter 18 and clock generator 22, thereby to derive the true character transmission clock frequency. That frequency is greater than the frequency of the output signal of counter 18 and clock generator 22 by a factor corresponding to the selected code and operating mode as established in counter 18 by switch 20. This ensures an appropriate number of shift pulses to register 44 during each cycle for each operating code and mode of the generator.

The bits of the stored test character in register 44 are thus serially shifted from register 44 at the true transmission clock frequency, one such test character being shifted during each cycle that is, for each occurrence of an address shift signal from clock generator 22. A complete test character in the selected code is thus applied to a data output interface 48 which converts the single level output signals to bipolar signals for compatibility with standard communication system requirements.

The output signal of counter 46 is also applied to the input of a clock gate 50, the output of which is connected to the input of a clock output interface 52. The latter converts its single level input to a bipolar output signal which defines the operating clock signals for the printer.

The occasion may arise when the test generator has transmitted a quantity of message characters which is beyond the capacity of the printer memory. When this occurs a bipolar data signal is derived at the printer and is applied to the input of a data overflow input interface 54, which converts that data overflow signal to a single polarity inhibit signal. That inhibit signal, when present, is applied to the inputs of clock gate 24, data gates 42, and clock gate 50 to prevent signal outputs from these gates, thereby to prevent further readout from memory 10 and further transmission of the outgoing clock to the printer.

As has been described, format generator 28 is selectively operative during the performance of the short line, Fox and complete message tests. During the performance of one or more of these tests the message is repeated a predetermined number of times after which the message transmission is terminated. In the format generator 28, shown in FIG. 3, the short line and Fox tests are each assigned 25 lines, and 50 lines are assigned to a complete message.

A typical circuit arrangement for the format generator 28 operating in the ITA-2 code is shown in FIG. 3. Format generator 28 is shown as comprising AND-gates 56 and 58 each of which receives the row and column select signals from the row and column counters 12 and 14. Gate 56 produces an output signal at the address input corresponding to the start of a short line test (row 2, column 1 in FIG. 2). That signal sets a flip-flop 60. AND-gate 58 produces a output signal when its row and column address inputs correspond to the address of the "LF" after the "E" in the word LINE (row 16, column 1 in FIG. 2). That output signal resets flip-flop 60.

In this manner, for each complete short line sequence, flip-flop 60 produces a single output pulse which is differentiated at 62 and inverted at 64. When switch 30 is in its short line select position, as shown in FIG. 3, that inverted signal is connected through the closed switch contacts 30*a* and 30*b* to the input of AND-gate 66, which produces an output reset pulse. That reset pulse is applied through a diode pulse steering circuit (not shown) to the appropriate stages of the row and column counters to reset them to the start address (row 2, column 1) for a short line test.

For a Fox test operation switch 30 is moved to the contacts indicated at "FOX" in FIG. 3. AND-gates 68 and 70 also receive the row and column select signals and are respectively effective to produce an output signal at the beginning (row 17, column 1) and the end (row 24, column 3) of a Fox test in the ITA-2 code. The first output signal sets a flip-flop 72 and the second output signal resets that flip-flop and produces a signal which is differentiated at 74, inverted at 76, and connected through the closed contacts 30*a* and 30*b* of switch 30 to the input of AND-gate 78. The output signal of gate 78 is applied to the appropriate stages of the row and column counters to reset the row and column counters to a start address (row 17, column 1), thereby to begin a new Fox Test sequence.

The short line and Fox Test reset signals produced at inverters 64 and 76 respectively are also connected through switch contact 30*a* to the input of a 25-to-1 line counter 80. Counter 80, depending on the position of switch 30, will count 25 reset pulses, corresponding to 25 message lines of either the short line or Fox Test. When 25 pulses have been sequentially applied to counter 80 it produces an output pulse which is connected through the closed contact 30*c* of switch 30 (for either the short line or Fox Test) to the input of AND-gate 82. Gate 82 in turn produces an end-of-message reset signal which is applied to the row and column counters 12 and 14 to reset them so as to address memory 10 at the location of the five-bit end-of-message word or sequence stored in the memory. As described above, the reading out of that word from memory 10 is sensed at end of message detector unit 36 which thereupon terminates test message transmission to the printer.

The output of counter 80 is also connected to the input of a flip-flop 84 to set that flip-flop to a condition indicating the completion of 25 lines of a message. The low or reset side of flip-flop 84 is connected to the other inputs of AND-gates 66 and 78, and is effective when flip-flop 84 is set to inhibit the production of any further trigger pulses by these gates.

A complete message consists of 25 short lines followed by 25 Fox Test lines. In the performance of this test switch 30 is in the "comp" position indicated by the broken line connections in FIG. 3. At the beginning of a test flip-flops 60, 72 and 84 are all set such tat AND-gate 86, connected to the output of inverter 64, is conducting. This allows the short line reset pulses to be conducted through AND-gate 88 and switch contact 30*a* to the input of counter 80. When that counter has counted 25 lines, flip-flop 84 is set and its low end is connected to the input of gate 86 to render that gate nonconductive, while at the same time rendering AND-gate 90 (to which the low end of flip-flop 84 is connected through inverter 92) conductive. This condition now allows the transfer of the Fox Test reset pulses from inverter 76 through AND-gates 90 and 88 and switch contact 30*a* to the input of counter 80.

At this time the path from the output of counter 80 through switch contact 30*c* is open so that AND-gate 82 receives no signal and the end-of-message word in memory 10 is not addressed. The output of counter 80 is, however, connected to the input of a 2:1 counter 94 which produces an output signal for every two pulses it receives from counter 80. Thus, at the completion of 25 lines of the Fox Test (and 50 lines of the complete message) counter 94 produces an output pulse. That pulse is applied to gate 82 to set the row and column counters to select the end-of-message sequence in the memory. As described, this has the effect of terminating a test message transmission.

The output pulse signal from counter 94 is applied to flip-flop 96 to set the latter to condition AND-gates 86 and 90 and inhibit any further reset pulse conduction through gates 86 and 90 to counter 80.

As indicated in FIG. 1, test message gate generator 26 is actuated by command unit 27. The latter has three input commands: "start," "continuous" and "stop." Selection is made between "continuous" and "stop." Thereafter a test message readout is initiated by actuating unit 27 to produce "start" command. A message may be terminated by the production of an end-of-mesage stop command by circuit 36 or by an external stop command. (A message readout is also terminated upon a data overflow which produces, as described above, a data inhibit signal via interface 54.) In a stop mode of operation (unit 27 set to produce a "stop" command) no reset pulses are applied to the reset sides of flip-flops 84 and 96 so that the generator becomes quiescent after the end-of-message sequence. Pressing the "start" command then resets flip-flops 84 and 96 to begin a new test message readout. The "stop" command may be overridden or counteracted by the setting of unit 27 to give a "continuous" command, which has the effect of applying at the end of an end-of-message sequence, via lines 98 and 100, reset pulses to flip-flops 94 and 96 respectively, to reset these flip-flops to their original condition. As a result, in the continuous mode of operation, a complete message unit is repeated at the end of each end-of-message sequence.

In operation, the selection of the test message is carried out by the operation of a five-position message selection switch 29 having positions corresponding to the short line, Fox, complete message, discrete character, and checkerboard tests. The desired character code is selected by the operation of switch 20 and the "start" command is produced at generator 26 by unit 27 to begin test message readout and transfer to the printer. The test message is repeated a predetermined number of times until an end-of-message unit is selected and then detected to stop the memory readout and reset the row and column counters to their starting positions. If continuous operation is desired a corresponding command is given to the generator 26 from unit 27, which has the effect of overriding the message termination operation.

The test message generator of the present invention thus has the capability of providing one or more of a wide selection of test messages to an external output device, such as a computer printer, to test the reliability and accuracy of that device. The testing of that device can be carried out without the use of the data equipment or data lines with which the device is normally incorporated when in operation. Since the data equipment is free for other use during testing and troubleshooting the output equipment, substantial savings in time and cost and increased efficiency of equipment utilization are all achieved. Moreover, with the use of the relatively compact test message generator of the present invention, the testing and troubleshooting of the output device may be performed at a more convenient maintenance area remote from the data equipment operating site.

While several sample test messages and character codes for use in testing a communications or computer printer have been herein specifically described, it will be understood that other test messages utilizing different codes, and the testing of other types of output equipment such as punching equipment and the like, could be carried out by the test message generator of the invention by altering the nature of the data contained in memory 10.

It will be apparent that other modifications and variations may be made to the present invention, all without departing from the spirit and scope of the invention.

I claim:

1. A generator for producing a signal for testing a computer printer normally adapted to be actuated by a series of output words from a computer operatively connected thereto, said generator comprising storage means having an output and a plurality of different test characters stored at predetermined address locations therein, said test characters singly and in various combinations defining output words adapted to actuate said computer printer, addressing means operatively connected to said storage means and effective when selectively actuated to transfer a predetermined one or more of said test characters to said output, thereby to define said output words, test signal selecting means operatively connected to said addressing means and effective to selectively actuate said addressing means in accord with a desired output word to be supplied to the computer printer, and means operatively connected to the output of said storage means and effective to transfer the selected output word to the computer printer.

2. The signal generator of claim 1, in which a control word is stored in said storage means, and further comprising means sensitive to the completion of a test message and effective when the completion of a test message is sensed to selectively transfer said control word to the output of said storage means, and means operatively connected to the output of said storage means, effective to detect said control word, and effective to terminate the operation of the generator upon the detection thereof.

3. The generator of claim 2, in which said control word transfer means comprises means operatively connected to said storage means output, effective to be actuated upon the occurrence of a predetermined generator output, and operatively connected to said addressing means to actuate the latter to address said memory at the address location of said preset word when said means is actuated.

4. The generator of claim 3, in which said addressing means comprises counting means operatively connected to said storage means output, effective to cause said addressing means to select an address in said storage means corresponding to the address location of said control word once said counting means has counted a predetermined number of output words.

5. The generator of claim 4, further comprising means operatively connected to said addressing means and effective to initially set said addressing means to a start address, means operatively connected to said addressing means and effective to sequentially change the setting of said addressing means to address different address locations in said storage means, and means operatively connected to said addressing means and effective upon the transfer of a desired output message to the output of said storage means to reset said addressing means to said start address, thereby to reinitiate an addressing sequence on said storage means.

6. The generator of claim 4, further comprising means operatively connected to said addressing means, effective to actuate said addressing means to select a single address location in said storage means, and to inhibit said address sequential changing means.

7. The generator of claim 4, further comprising means operatively connected to said addressing means and effective to produce a pair of sequentially alternating address signals to said storage means and to inhibit said address sequential changing means thereby to produce at the output of said storage means an output word having a repeating pattern of two alternating characters.

8. The generator of claim 3, further comprising means effective to initially set said addressing means to a start address, means to sequentially change the setting of said addressing means to address different address locations in said storage means, and effective upon the transfer of a desired output message to the output of said storage means to reset said addressing means to said start address, thereby to reinitiate an addressing sequence on said storage means.

9. The generator of claim 8, further comprising means operatively connected to said addressing means, effective to actuate said addressing means to select a single address location in said storage means, and to inhibit said address sequential changing means.

10. The generator of claim 8, further comprising means operatively connected to said addressing means and effective to produce a pair of sequentially alternating address signals to said storage means and to inhibit said address sequential changing means, thereby to produce at the output of said storage means an output word having a repeating pattern of two alternating characters.

11. The generator of claim 2, further comprising means effective to initially set said addressing means to a start address, means to sequentially change the setting of said addressing means to address different address locations in said storage means, and means effective upon the transfer of a desired output message to the output of said storage means to reset said addressing means to said start address, thereby to reinitiate an addressing sequence on said storage means.

12. The generator of claim 11, further comprising means operatively connected to said addressing means, effective to actuate said addressing means to select a single address location in said storage means, and to inhibit said address sequential changing means.

13. The generator of claim 11, further comprising means operatively connected to said addressing means and effective to produce a pair of sequentially alternating address signals to said storage means and to inhibit said address sequential changing means, thereby to produce at the output of said storage means an output word having a repeating pattern of two alternating characters.

14. The generator of claim 1, further comprising means effective to initially set said addressing means to a start address, means to sequentially change the setting of said addressing means to address different address locations in said storage means, and means effective upon the transfer of a desired output message to the output of said storage means to reset said addressing means to said start address, thereby to reinitiate an addressing sequence on said storage means.

15. The generator of claim 14, further comprising means operatively connected to said addressing means, effective to actuate said addressing means to select a single address location in said storage means, and to inhibit said address sequential changing means.

16. The generator of claim 14, further comprising means operatively connected to said addressing means and effective to produce a pair of sequentially alternating address signals to said storage means and to inhibit said address sequential changing means, thereby to produce at the output of said storage means an output word having a repeating pattern of two alternating characters.

17. A generator for producing a signal for testing a computer printer normally adapted to be actuated by a series of output words from a computer operatively connected thereto, said generator comprising storage means having an output and a plurality of different test characters stored at predetermined address locations therein, said test characters singly and in various combinations defining output words adapted to actuate said computer printer, addressing means operatively connected to said storage means and effective when selectively actuated to transfer a predetermined one or more of said test characters to said output, thereby to define said output words, and control means operatively connected to said addressing means and selectively actuatable to cause said addressing means selectively to (a) transfer the same word repetitively to said output or (b) transfer a given plurality of words repetitively to said output.

18. The signal generator of claim 17, in which a control word is stored in said storage means, and further comprising means sensitive to the completion of a test message and effective when the completion of a test message is sensed to selectively transfer said control word to the output of said storage means, and means operatively connected to the output of said storage means, effective to detect said control word, and effective to terminate the operation of the generator upon the detection thereof.

19. The generator of claim 18, in which said control word transfer means comprises means operatively connected to said storage means output, effective to be actuated upon the occurrence of a predetermined generator output, and operatively connected to said addressing means to actuate the latter to address said memory at the address location of said preset word when said means is actuated.

20. The generator of claim 19, in which said addressing means comprises counting means operatively connected to said storage means output, effective to count said output words and effective to cause said addressing means to select an address in said storage means corresponding to the address location of said control word once said counting means has counted a predetermined number of output words.

21. The generator of claim 17, further comprising means operatively connected to said addressing means and effective to initially set said addressing means to a start address, means operatively connected to said addressing means and effective to sequentially change the setting of said addressing means to address different address locations in said storage means, and means operatively connected to said addressing means and effective upon the transfer of a desired output message to the output of said storage means to reset said addressing means to said start address, thereby to reinitiate an addressing sequence on said storage means.

22. The generator of claim 17, in which said control means, in transferring a given plurality of words respectively to said output as in (b), is further selectively actuatable to ($b_1$) transfer two words repetitively in the same order, or ($b_2$) transfer an extended sequence of words making up a predetermined message.

23. The signal generator of claim 22, in which a control word is stored in said storage means, and further comprising means effective at the completion of a test message to selectively transfer said control word to the output of said storage means, and means operatively connected to the output of said storage means, effective to detect said control word, and to terminate the operation of the generator upon the detection thereof.

24. The generator of claim 23, in which said control word transfer means comprises means operatively connected to said storage means output, effective to be actuated upon the occurrence of a predetermined generator output, and operatively connected to said addressing means to actuate the latter to address said memory at the address location of said preset word when it is actuated.

25. The generator of claim 24, in which said addressing means comprises counting means operatively connected to said storage means output effective to count said output words and effective to cause said addressing means to select an address in said storage means corresponding to the address location of said control word once said counting means has counted a predetermined number of output words.

26. The generator of claim 22, further comprising means effective, when said addressing means is caused to operate as in ($b_1$), to initially set said addressing means to a start address, means to sequentially change the setting of said addressing means to address different address locations in said storage means, and means effective upon the transfer of said message to the output of said storage means to reset said addressing means to said start address, thereby to reinitiate an addressing sequence on said storage means.

27. A generator for producing a signal for testing an output device, said generator comprising storage means having an output and a plurality of different test characters stored at predetermined address locations therein, said test characters singly and in various combinations defining output word adapted to actuate said output device, addressing means operatively connected to said storage means and effective when selectively actuated to transfer a predetermined one or more of said test characters to said output, thereby to define said output words, test signal selecting means operatively connected to said addressing means and effective to selectively actuate said addressing means in accord with a desired output word to be supplied to the the output device, and means operatively connected to the output of said storage means and effective to transfer the selected output word to the output device, in which a control word is stored in said storage means, and further comprising means sensitive to the completion of a test message and effective when the completion of a test message is sensed to selectively transfer said control word to the output of said storage means, and means operatively connected to the output of said storage means, effective to detect said control word, and effective to terminate the operation of the generator upon the detection thereof in which said control word transfer means comprises means operatively connected to said storage means output, effective to be actuated upon the occurrence of a predetermined generator output, and operatively connected to said addressing means to actuate the latter to address said memory at the address location of said preset word when said means is actuated, and in which said addressing means comprises counting means operatively connected to said storage means output, effective to count said output words and effective to cause said addressing means to select an address in said storage means corresponding to the address location of said control word once said counting means has counted a predetermined number of output words.

28. The generator of claim 27, further comprising means operatively connected to said addressing means and effective to initially set said addressing means to a start address, means operatively connected to said addressing means and effective to sequentially change the setting of said addressing means to address different address locations in said storage means, and means operatively connected to said addressing means and effective upon the transfer of a desired output message to the output of said storage means to reset said addressing means to said start address, thereby to reinitiate an addressing sequence on said storage means.

29. The generator of claim 27, further comprising means operatively connected to said addressing means, effective to actuate said addressing means to select a single address location in said storage means, and to inhibit said address sequential changing means.

30. The generator of claim 27, further comprising means operatively connected to said addressing means and effective to produce a pair of sequentially alternating address signals to said storage means and to inhibit said address sequential changing means, thereby to produce at the output of said storage means an output word having a repeating pattern of two alternating characters.

31. A generator for producing a signal for testing an output device, said generator comprising storage means having an output and a plurality of different test characters stored at predetermined address locations therein, said test characters singly and in various combinations defining output words adapted to actuate said output device, addressing means operatively connected to said storage means and effective when selectively actuated to transfer a predetermined one or more of said test characters to said output, thereby to define said output words, test signal selecting means operatively connected to said addressing means and effective to selectively actuate said addressing mans in accord with a desired output word to be supplied to the output device, and means operatively connected to the output of said storage means and effective to transfer the selected output word to the output device, in which a control word is stored in said storage means, and further comprising means sensitive to the completion of a test message and effective when the completion of a test message is sensed to selectively transfer said control word to the output of said storage means, and means operatively connected to the output of said storage means, effective to detect said control word, and effective to terminate the operation of the generator upon the detection thereof, in which said control word transfer means comprises means operatively connected to said storage means output, effective to be actuated upon the occurrence of a predetermined generator output, and operatively connected to said addressing means to actuate the latter to address said memory at the address location of said preset word when said means is actuated, and further comprising means effective to initially set said addressing means to a start address, means to sequentially change the setting of said addressing means to address different address locations in said storage means, and effective upon the transfer of a desired output message to the output of said storage means to reset said addressing means to said start address, thereby to reinitiate an addressing sequence on said storage means.

32. The generator of claim 31, further comprising means operatively connected to said addressing means, effective to actuate said addressing means to select a single address location in said storage means, and to inhibit said address sequential changing means.

33. The generator of claim 31, further comprising means operatively connected to said addressing means and effective to produce a pair of sequentially alternating address signals to said storage means and to inhibit said address sequential changing means, thereby to produce at the output of said storage means an output word having a repeating pattern of two alternating characters.

34. A generator for producing a signal for testing an output device, said generator comprising storage means having an output and a plurality of different test characters stored at predetermined address locations therein, said test characters singly and in various combinations defining output words adapted to actuate said output device, addressing means operatively connected to said storage means and effective when selectively actuated to transfer a predetermined one or more of said test characters to said output, thereby to define said output words, test signal selecting means operatively connected to said addressing means and effective to selectively actuate said addressing means in accord with a desired output word to be supplied to the output device, and means operatively connected to the output of said storage means and effective to transfer the selected output word to the output device, in which a control word is stored in said storage means, and further comprising means sensitive to the completion of a test message and effective when the completion of a test message is sensed to selectively transfer said control word to the output of said storage means, and means operatively connected to the output of said storage means, effective to detect said control word, and effective to terminate the operation of the generator upon the detection thereof, and further comprising means effective to initially set said addressing means to a start address, means to sequentially change the setting of said addressing means to address different address locations in said storage means, and means effective upon the transfer of a desired output message to the output of said storage means to reset said addressing means to said start address, thereby to reinitiate an addressing sequence on said storage means.

35. The generator of claim 34, further comprising means operatively connected to said addressing means, effective to actuate said addressing means to select a single address location in said storage means, and to inhibit said address sequential changing means.

36. The generator of claim 34, further comprising means operatively connected to said addressing means and effective to produce a pair of sequentially alternating address signals to said storage means and to inhibit said address sequential changing means, thereby to produce at the output of said storage means an output word having a repeating pattern of two alternating characters.

37. A generator for producing a signal for testing an output device, said generator comprising storage means having an output and a plurality of different test characters stored at predetermined address locations therein, said test characters singly and in various combinations defining output words adapted to actuate said output device, addressing means operatively connected to said storage means and effective when selectively actuated to transfer a predetermined one or more of said test characters to said output, thereby to define said output words, test signal selecting means operatively connected to said addressing means and effective to selectively actuate said addressing means in accord with a desired output word to be supplied to the output device, and means operatively connected to the output of said storage means and effective to transfer the selected output word to the output device, further comprising means effective to initially set said addressing means to a start address, means to sequentially change the setting of said addressing means to address different address locations in said storage means, and means effective upon the transfer of a desired output message to the output of said storage means to reset said addressing means to said start address, thereby to reinitiate an addressing sequence on said storage means.

38. The generator of claim 37, further comprising means operatively connected to said addressing means, effective to actuate said addressing means to select a single address location in said storage means, and to inhibit said address sequential changing means.

39. A generator for producing a signal for testing an output device, said generator comprising storage means having an output and a plurality of different test characters stored at predetermined address locations therein, said test characters singly and in various combinations defining output words adapted to actuate said output device, addressing means operatively connected to said storage means and effective when selectively actuated to transfer a predetermined one or more of said test characters to said output, thereby to define said output words, and control means operatively connected to said addressing means and selectively actuatable to cause said addressing means selectively to (a) transfer the same word repetitively to said output or (b) transfer a given plurality of words repetitively to said output, in which said control means, in transferring a given plurality of words respectively to said output as in (b), is further selectively actuatable to ($b_1$) transfer two words repetitively in the same order, or ($b_2$) transfer an extended sequence of words making up a predetermined message.

40. The signal generator of claim 39, in which a control word is stored in said storage means, and further comprising means effective at the completion of a test message to selectively transfer said control word to the output of said storage means, and means operatively connected to the output of said storage means, effective to detect said control word, and to terminate the operation of the generator upon the detection thereof.

41. The generator of claim 40, in which said control word transfer means comprises means operatively connected to said storage means output, effective to be actuated upon the occurrence of a predetermined generator output, and operatively connected to said addressing means to actuate the latter to address said memory at the address location of said preset word when it is actuated.

* * * * *